United States Patent [19]

Bäuerle

[11] 4,427,413
[45] Jan. 24, 1984

[54] DYE MIXTURE, AND ITS USE IN TRANSFER PRINTING

[75] Inventor: Rolf Bäuerle, Riehen, Switzerland

[73] Assignee: Ciba-Geigy A.G., Basel, Switzerland

[21] Appl. No.: 444,023

[22] Filed: Nov. 23, 1982

[30] Foreign Application Priority Data

Dec. 24, 1981 [CH] Switzerland ................. 8281/81

[51] Int. Cl.$^3$ ................................ C09B 29/00
[52] U.S. Cl. ................................... 8/471; 8/639;
8/696; 8/921; 8/922; 8/924; 8/927
[58] Field of Search ........................... 8/471, 639

[56] References Cited

U.S. PATENT DOCUMENTS 2,006,022  6/1935  Kranzlein et al. ............... 546/154
3,905,951  9/1975  Berrie et al. .................... 546/193

Primary Examiner—A. Lionel Clingman
Attorney, Agent, or Firm—Joseph G. Kolodny

[57] ABSTRACT

A dye mixture is described which contains the dye of the formula I

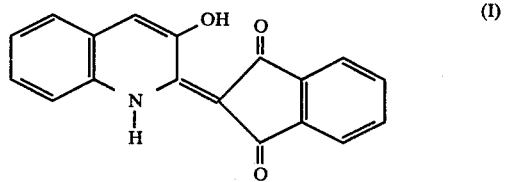

and the dye of the formula II

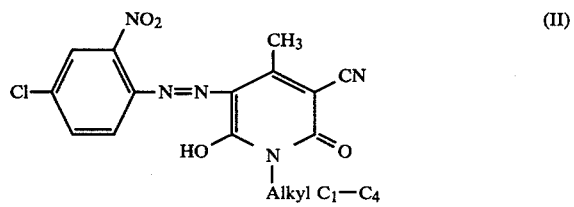

and in which the dye of the formula II is present in excess.

Such a dye mixture, with or without further transferrable dyes, is used in transfer printing and enables the preparation of sharply contoured, aureole-free prints.

11 Claims, No Drawings

DYE MIXTURE, AND ITS USE IN TRANSFER PRINTING

The invention relates to a dye mixture which contains the dye of the formula I

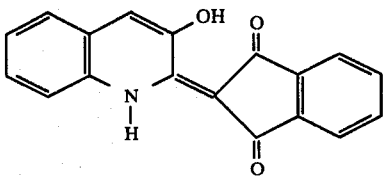

and the dye of the formula II

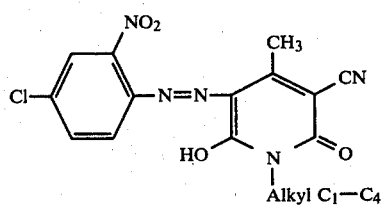

with the dye of the formula II present in excess, the use of the dye mixture in transfer printing, the textile material transfer-printed using the dye mixture, printing colours containing the dye mixture, and auxiliary carriers printed with these printing colours.

The dye of the formula I (C.I. Disperse Yellow 54-C.I. 47,020) and its use in transfer printing are known. However, this dye, with which strong yellow shades are obtained on polyester fabric, has the disadvantage that its vapour pressure is high at the temperatures customary in transfer printing, namely 150° to 220° C. The dye sublimes too rapidly within this temperature range, and produces diffuse prints. In particular, when the dye is used mixed with other transfer dyes, prints are obtained which have diffuse yellow edges, so-called aureoles.

The dyes of the formula II are also known (U.S. Pat. No. 3,905,951) or accessible by the methods customary for azo dyes. However, these dyes have a low vapour pressure at temperatures around 200° C. and have accordingly hitherto not been used in transfer printing, since they produce weak prints which are commercially unacceptable.

It was the object of the present invention to affect the transfer characteristics of the dye of the formula I in such a way that this dye produces sharply contoured, aureole-free prints under the conditions used.

This object is achieved according to the invention if the dye of the formula I is used in a mixture with the dye of the formula II in which the dye of the formula II is present in excess.

Surprisingly, these mixtures have balanced transfer properties and produce strong prints which have a point-exact appearance. It has also been found that when used mixed the dyes of the formulae I and II build up to give deeper shades and hence better yields than when used individually.

Moreover, the transfer characteristics of the dye mixture are similar to those of other dyes used in transfer printing, which is why the yellow mixture of the invention is readily combinable with other transfer dyes.

The alkyl group in the dye of the formula II has 1 to 4 C atoms, and is unbranched or branched. It is, for example, the methyl, ethyl, n-propyl, n-butyl or isobutul group. Those dyes of the formula II in which the pyridone nitrogen carries an ethyl or n-butyl radical are preferable components of the mixture.

Particularly strong and sharply contoured prints are obtained on polyester material with dye mixtures which contain 1.1 to 3 parts by weight of dye of the formula II, in particular 1.5 parts by weight of dye of the formula II, per 1 part by weight of dye of the formula I.

The dye mixture of the invention is used in transfer printing, where the dye mixture can be incorporated without problems in a high concentration into readily pourable low-electrolyte and -dispersant print pastes, which are very much in demand thanks to the low level at which these print pastes are applied to paper. The dye mixture is applied as such or applied combined with at least one further dye suitable for transfer printing.

Suitable substrates are semi-synthetic and fully synthetic textile materials, in particular woven and knitted fabrics of polyamide 6, polyamide 6.6, polyacrylonitrile, cellulose triacetate and, in particular, polyesters, such as polyethylene glycol terephthalate.

The printing colours which contain a mixture of dyes of the formulae I and II and can, if desired, also contain other transfer dyes and with which the particular auxiliary carrier is printed or impregnated are aqueous or aqueous-organic print pastes, or organic printing inks.

Aqueous and aqueous-organic print pastes contain the dye mixture of the invention and can, if desired, also contain other transfer dyes and customary natural or synthetic thickeners, for example polyvinyl alcohols, methylcellulose or carboxyl-containing polymerisation products, for example polyacrylates.

Organic printing inks generally consist of a binder, a dispersant and an organic solvent, for example isopropyl alcohol.

Both print pastes and printing inks can also contain further property-improving constituents, such as preservatives, fillers, deaerators or humectants.

The printing colours can be used in all customary printing methods, i.e. letterpress, planographic, gravure or screen printing. Particularly suitable methods for preparing printed paper auxiliary carriers are gravure printing and rotary screen printing.

Suitable auxiliary carriers are all sheet-like structures which are inert to applied dyes and do not impair sublimation (see, for example, German Offenlegungsschrift No. 1,771,812 or German Offenlegungsschrift 2,443,063). Metal foils, such as aluminium foils, or, in particular, paper webs are suitable.

The examples which follow, parts and percentages are by weight unless otherwise stated.

EXAMPLE 1

A paper auxiliary carrier is rotary-printed with a print paste of the following composition:

16 g of dye preparation consisting of 46.24% of dye of the formula I, 0.1% of ligninsulfonate, 5.28% of a block polymer of 80% of ethylene oxide and 20% of propylene oxide and which has a molecular weight of 16,250, 21.13% of propylene glycol, 0.29% of chloroacetamide, 0.81% of 30% formalin and 26.21% of water; 24 g of dye preparation consisting of 45% of dye of the formula II in which alkyl $C_1$–$C_4$ is ethyl, 0.11% of ligninsulfonate, 5.62% of an ethylene oxide/propylene oxide block polymer of said composition (molecular weight 16.250), 22.5% of propylene glycol, 0.27% of chloroacetamide, 0.76% of 30% formalin and 25.71% of water (mixing ratio of dye I to dye II is 1:1.5); 32 g of acrylate thickener (concentrate containing 15% of previously neutralised polyacrylic acid); 48 g of 3% sodium hydroxide solution; 4.8 g of deaerator based on 2-ethylhexanol; 120 g of a 20% solution of a polyvinyl alcohol; 0.8 g of 35% formalin; and 754.4 g of water.

The print paste is applied to parts of the area or to the whole area. The printed auxiliary carrier is dried for 5 to 10 seconds at 100° C. It is fast to rubbing, and can be used any time for printing synthetic fibre materials by the thermal and dry transfer printing method.

To print the fibre material, the auxiliary carrier and a polyester fabric with a weight per unit area of 100 g/m² are pressed against each other under a pressure of 0.04 to 0.06 bar for 30 seconds at 210° C. in a hot press. After the dye mixture has transferred from the intermediate carrier to the polyester fabric, yellow, intense and sharply contoured patterns are obtained on the fabric.

If other fibre materials, such as polyacrylonitrile, cellulose triacetate or polyamide, are printed, strong prints are again obtained. If dyes I or II are used on their own in place of the dye mixture, the two cases produce markedly paler prints which, in the case of the dye component I, are neither sharply contoured.

EXAMPLE 2

A paper auxiliary carrier is rotary-printed with a print paste of the following composition:

10 g of dye preparation containing the dye of the formula I and having the composition specified in Example 1; 15 g of dye preparation containing the dye of the formula II in which alkyl C₁–C₄ is ethyl and having the composition specified in Example 1; 15 g of dye preparation consisting of 27.76% of a mixture of two dyes of the formula

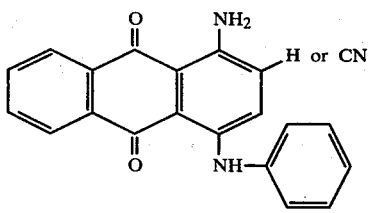

0.1% of ligninsulfonate, 4.94% of an ethylene oxide/-propylene oxide block polymer of said composition (molecular weight 16,250), 19.5% of ethylene glycol, 0.3% of chloroacetamide, 0.84% of 30% formaldehyde and 46.56% of water; the other components, such as thickener, deaerator, antimicrobic agents and water, are added in the amounts specified in Example 1.

The printed auxiliary carrier is dried at 100° C. for 5 to 10 seconds.

If the auxiliary carrier prepared in this way is used to print a polyester fabric as described in Example 1, a sharply contoured and aureole-free green print is obtained.

If only the dye of the formula I is used in place of the dyes of the formulae I and II but in an amount sufficient to obtain the same green shade, unacceptable results are obtained. The yellow component of the formula I leads to prints which have diffuse yellow edges, socalled aureoles.

What is claimed is:

1. A dye mixture which contains the dye of the formula I

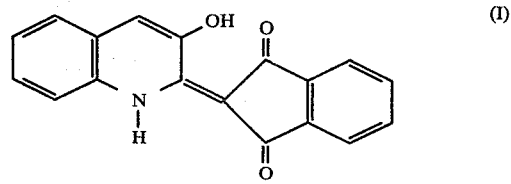

and the dye of the formula II

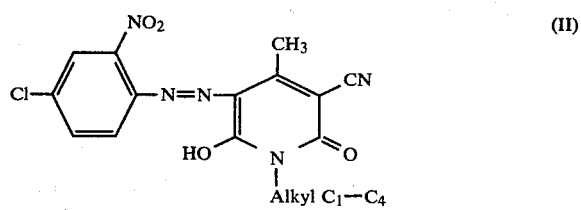

and in which the dye of the formula II is present in excess.

2. A dye mixture according to claim 1, in which alkyl C₁–C₄, in the formula II, is the ethyl or n-butyl radical.

3. A dye mixture according to claim 1, which contains 1 part by weight of the dye of the formula I and 1.1 to 3 parts by weight of the dye of the formula II.

4. A dye mixture according to claim 3, which contains 1 part by weight of the dye of the formula I and 1.5 parts by weight of the dye of the formula II.

5. A polyamide 6; polyamide 6,6; polyacrylonitrile, cellulose acetate or polyester textile material transfer-printed using a dye mixture according to claim 1.

6. A printing colour with an aqueous, aqueous-organic or organic base and which contains in addition to the customary constituents a dye mixture according to claim 1, and which, optionally, contains further transferrable dyes.

7. An auxiliary carrier for transfer printing, which has been printed or impregnated with a printing colour according to claim 6.

8. A transfer printing process which comprises applying to a semi-synthetic or fully synthetic textile material by the transfer method a dye mixture of claim 1.

9. A transfer printing process of claim 8 wherein the textile material is polyamide 6; polyamide 6,6; polyacrylonitrile; cellulose triacetate or polyester.

10. A transfer printing process of claim 9 wherein the textile material is polyethylene glycol terephthalate.

11. A transfer printing process of claim 8 wherein the dye mixture is applied combined with at least one further dye suitable for transfer printing.

* * * * *